Nov. 4, 1969    R. GOLDEN ET AL    3,476,945

FLAME DETECTOR FOR A MULTIPLE FUEL-FIRED FURNACE

Filed Feb. 23, 1968

INVENTORS
RAYMOND GOLDEN
ROBERT A. MURZYN
WILLIAM E. WILSON

BY Michael P. Lynch

ATTORNEY

United States Patent Office 3,476,945
Patented Nov. 4, 1969

3,476,945
FLAME DETECTOR FOR A MULTIPLE FUEL-FIRED FURNACE
Raymond Golden, Willowick, and Robert A. Murzyn, Lyndhurst, Ohio, and William E. Wilson, Lynchburg, Va., assignors to Bailey Meter Company, a corporation of Delaware
Filed Feb. 23, 1968, Ser. No. 707,860
Int. Cl. H01j 39/12
U.S. Cl. 250—217          10 Claims

ABSTRACT OF THE DISCLOSURE

A single flame detector housing incorporating two characteristically different sensor elements each of which responds to a specific fuel flame by generating an output signal indicative of the presence or absence of said flame.

BACKGROUND OF THE INVENTION

Field of the invention

This invention relates to radiation responsive devices and more particularly to a radiation device which distinguishes between flames of different fuels.

Description of the prior art

Considerable effort has been expended in the design of flame monitoring apparatus which will discriminate between the presence and absence of flame by sensing the level of ultraviolet radiation emitted by a source. Ultraviolet radiation is only one of several flame characteristics which can be observed optically. Detectors have also been developed which are substantially insensitive to ultraviolet radiation but sensitive to the visible spectrum of a flame and generate signals corresponding to the amplitude of the high frequency flicker of and the illumination level of the flame. Each of these independent detectors is particularly sensitive to the flame characteristics of specific fuels and neither alone can adequately monitor a combustion zone served simultaneously or sequentially by different fuels.

Our dual detector, flame monitoring apparatus combines these two characteristically different detectors in a unique single detector system which provides an improved, integrated and compact means of monitoring a multiple fuel-fired furnace from a common sighting position.

SUMMARY OF THE INVENTION

A flame detector having a tubular housing with a lens at one end to direct radiant energy to a dual detector unit mounted within the housing. An ultraviolet detector generates a signal indicative of the ultraviolet radiation level of a sighted flame, whereas a silicon photovoltaic cell provides a signal indicative of the amplitude of the high frequency flicker of the sighted flame and the illumination level of the flame. An adjustable iris plate permits sighting of the photovoltaic cell on a limited portion of the radiation field viewed by the lens and thus establishes the sensitivity of the cell.

DESCRIPTION OF THE PREFERRED EMBODIMENT

Figure 1:
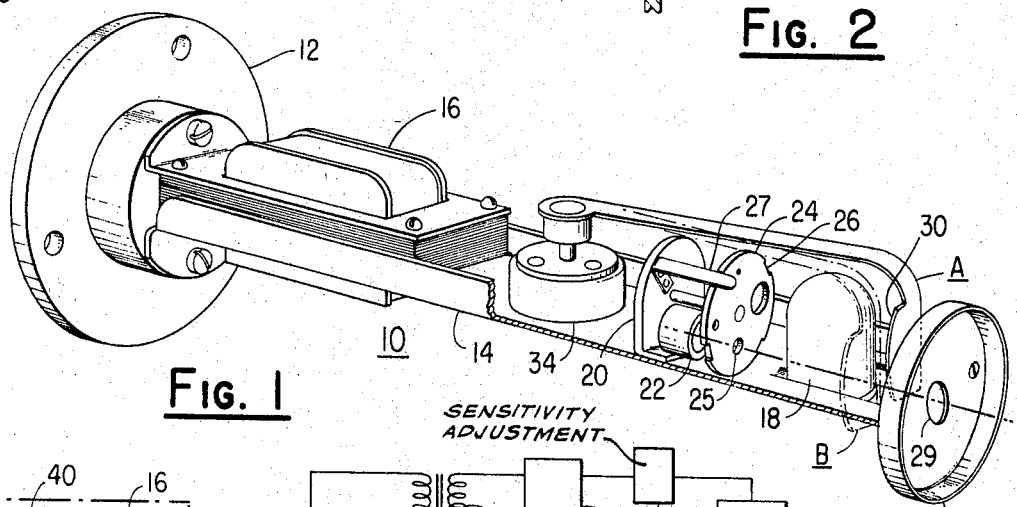
FIG. 1 is a perspective view of the dual element flame detector.

Referring to FIG. 1, there is illustrated a flame detector 10 which represents a typical embodiment of our invention. Flame detector 10 includes mounting flange 12, sensor support bracket 14 fixedly connected to said flange and a dual element optical sensor unit, which will be discussed in detail hereinafter, mounted on said support bracket.

The dual element optical sensor utilizes the distinguishing characteristics of ultraviolet sensor 18 and silicon photovoltaic cell 22 to discriminate between various flame sources of radiation viewed through the central aperture 29 of sighting plate 28. The main purpose of flame monitoring is to reliably and safely acknowledge the presence or absence of flame. The characteristic of a flame that may be observed optically are as follows:

(1) Spectrum: (a) Ultraviolet in the range of 2,000–3,000 A.; (b) Visible and infrared radiation in the range 4,000–11,500 A.

(2) High frequency flicker of the flame in the primary combustion zone having a frequency range of 200–1,500 Hz.

(3) Low frequency flicker in the range of 0–200 Hz. found in the background or the trailing edges of a burning solid or liquid fossil fuel.

Ultraviolet radiation detector 18 is responsive to the ultraviolet spectrum and, therefore, produces an output signal indicative of the ultraviolet radiation level present in a flame. A typical ultraviolet detector is shown and described in United States Patent Ser. No. 3,047,761 which issued July 31, 1962. The silicon photovoltaic cell 22, however, is not responsive to the ultraviolet spectrum but rather is primarily sensitive to the flame's visible and near infrared spectrum. The cell is a silicon P-N or N-P junction photovoltaic cell generating an E.M.F. substantially proportional to the logarithm of the illumination thereof by the flame. The dual optical sensor unit of flame detector 10 combines these two characteristically different sensor elements into an integral unit which provides complete flame monitoring capability. The operation of sensors 18 and 22, wherein ultraviolet sensor 18 is responsive primarily to the gas flame spectrum and photovoltaic cell 22 responds exceptionally well to combustion of pulverized coal and oil, provides a single detector package which can monitor flame on-off condition in a multiple fuel-fired furnace from a single sighting location. Flame detector 10, when properly sighted, is, for example, capable of discriminating between the lighter flame and the main flame when said flames are produced by dissimilar fuels.

Transformer 16 steps up a low A.C. voltage supply, for example 25 v. A.C., to the high excitation voltage level required for ultraviolet sensor 18. The inclusion of transformer 16 in the detector permits low voltage transmission between remote locations and the detector thereby improving overall saftey and ease of installation.

Shutter 30 actuated by rotary solenoid 34, provides means for remotely checking the condition of sensors 18 and 22. During normal operating conditions, shutter 30 is maintained in position A thus permitting sensors 18 and 22 to respond to the radiant energy viewed through aperture 29. If at any time a check of sensor condition is desired, solenoid 34 is actuated by a remote signal, either automatically or manually produced, causing shutter 30 to rotate to position B thereby isolating sensors 18 and 22 from the radiation source. Sensor output is then measured to determine if circuit failure has occured.

The absence of failure or the presence of a fail safe condition would be represented by an output of say zero volts, whereas an unsafe circuit failure would be represented by the presence of a significant sensor output voltage signal.

Photovoltaic cell 22 is mounted on support plate 20 in axial alignment with the central aperture 29 of sighting plate 28; said alignment permitting the radiation viewed by ultraviolet sensor 18 to be transmitted through the transparent envelope of said sensor so that it will ultimately impinge on photovoltaic cell 22. Support plate 20, which is fixedly mounted on bracket 14, likewise provides a mounting surface for a rotatable, circular iris plate 24 and iris selector tab 27. Iris plate 24, which intersects the radiation beam received by cell 22, contains a plurality of iris apertures 25 of varying diameter spaced about and circumferentially located near the periphery of the iris plate. Selector notches 26, located on the peripheral edge of plate 24, accept selector tab 27 and are so located as to axially align a desired iris aperture with the radiation beam when said selector tab 27 is engaged with a specific notch. Selector tab 27 is made of a spring material and is manually removed from a notch to permit manual rotation of iris plate 24. The notch and tab arrangement is provided to adjust the radiation level incident upon cell 22 by positioning the proper iris aperture between the radiation source and cell 22. The iris adjustment compensates for flame sources of varying intensity by providing an iris aperture setting for different flame intensity thereby establishing a single output signal range for any source sighted. Furthermore, the iris adjustment permits reduction of the sight area to a smaller increment of the flame pattern which both reduces the intensity level thereby preventing the cell from saturating and increases cell 22 sensitivity to the high intensity spectrum in the primary combustion zone.

The characteristics of ultraviolet sensor 18 are such that attenuation of the radiant energy is not required.

Figure 2:
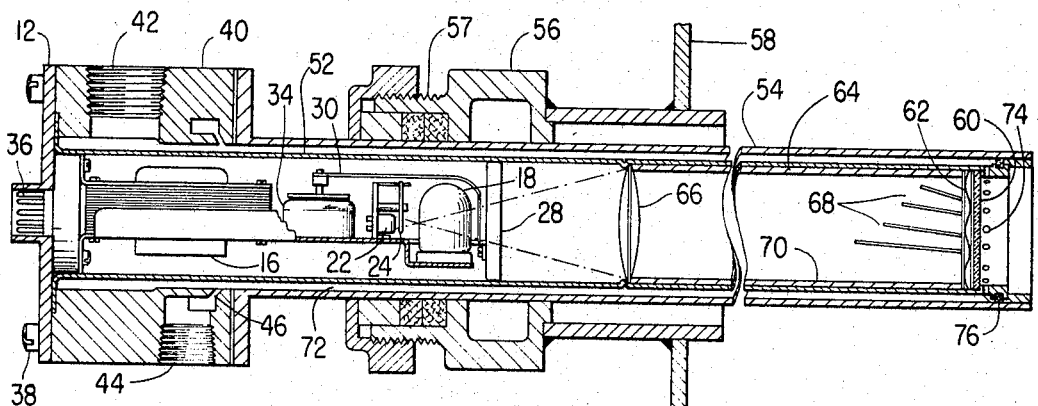
FIG. 2 is a sectional view of the flame detector and housing combination.

In FIG. 2, we show flame detector 10 arranged in a typical wall-mounted housing consisting basically of a purge housing 40, optical sensor tube 52, isolation tube 54 and wall mounting adapter 56 which is mounted on and passes through furnace wall 58 and secures the detector housing assembly in a position for viewing flame radiation within the furnace. The securing of mounting flange 12 of the flame detector 10 to the detector housing by means of screws 38 positions it in optical sensor tube 52.

We have shown our detector mounted in the furnace wall 58 for illustrative purposes only, it being evident that the detector can be mounted as required to properly view the flame under surveillance. Thus, in some cases, the detector may be mounted to view the flame through a burner or through a windbox. As shown, the isolation tube 54 is positioned in the wall mounting adapter 56 through a packing gland assembly 57 thus providing for longitudinal and angular adjustment as required to properly view the flame under surveillance.

Flame radiation transmitted through quartz window 60, which is maintained in position by wave washer 62, is concentrated on radiation sensors 18 and 22 by double convex lens 66. As taught by R. J. Stevens in United States patent application Serial No. 445,949 filed April 6, 1965, now Patent 3,454,767, the inner surface of reflecting tube 64 may be polished, coated or otherwise finished to provide a reflective surface so that radiation reflected from mirrors 68, which is not parallel to the longitudinal axis of tube 64, upon striking the walls thereof, will be reflected to lens 66.

The clearance between optical sensor tube 52 and isolation tube 54 establishes an annular air flow passage for low pressure purge air which can be introduced through port 42 of housing 40. Pressure seal 76 prevents purge air from entering the furnace and causes said air to exhaust through a plurality of apertures 74 which encircle window 60 and which direct the purge air against the outer surface of said window to prevent the deposit of ash and other products of combustion on the window surface.

A source of high pressure air may be introduced through pressure port 44 and discharged radially into passage 72 by annular jet 46. The function of the high pressure air is to create a positive pressure curtain at the sensor end of the housing and to confine the high temperature environment of the furnace to the furnace end of the housing thus permitting the removal of detector 10 from the housing assembly in a safe, cool environment. As will be evident to those skilled in the art, the supply lines (not shown) leading to ports 42 and 44 may be provided with suitable valves so that during normal operation, only low pressure purge air will be introduced into passage 72; but when the flame detector 10 is withdrawn from the isolation tube 54 for inspection or repair, the supply of low pressure purge air is shut off and high pressure air introduced through port 44.

In the interest of simplicity and clarity, the electrical connections to ultraviolet sensor 18, photovoltaic cell 22, transformer 16 and rotary solenoid 34 have been omitted from FIGS. 1 and 2. These connections are shown in schematic form in FIG. 3, however, and are conveniently brought to the aforesaid elements through a bushing 36 in mounting flange 12 as shown in FIG. 2.

Figure 3:
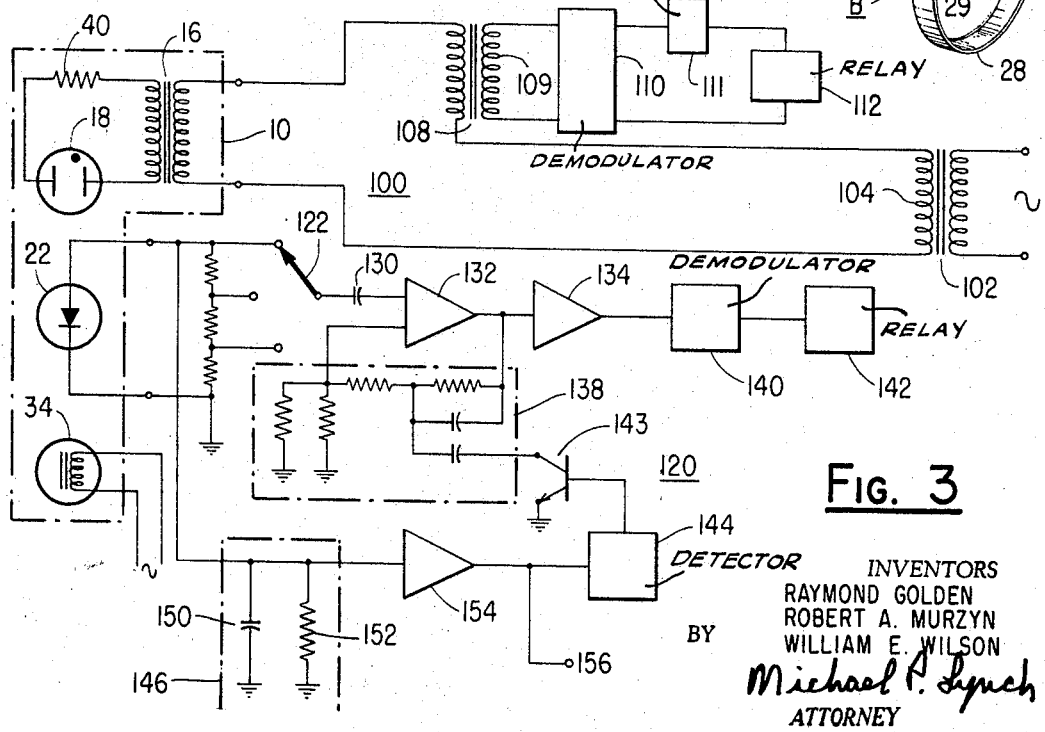
FIG. 3 is a schematic illustration of the electrical circuit of the dual element flame detector.

Referring now to FIG. 3, the measuring circuitry consists of a circuit 100 associated with ultraviolet sensor 18 and circuit 120 associated with photovoltaic cell 22. Ultraviolet sensor circuit 100 employs the reflective impedance approach for transmitting low excitation and signal voltage between the flame detector and a remote station. Supply transformer 102 reduces line voltage to a safe, convenient low value of, for example, 25 v. at secondary winding 104 for transmission to the sensor 18 excitation transformer 16 located in flame detector 10. Transformer 16 has a step up ratio to establish the required excitation voltage for ultraviolet sensor 18, usually in the order of 500 v. A.C. Resistor 90 is inserted in series with sensor 18 to limit the current flow in the event the electrodes of sensor 18 are shorted. Output transformer 108 serves to isolate the output circuitry from the sensing circuit as well as stepping up the output signal voltage of circuit 100 to a practical level for control and indication purposes.

The impedance reflected across transformer 16 when ultraviolet sensor 18 is not conducting is very high, thus the primary current drawn by transformers 16 and 108 is approximately zero. Therefore, the circuit output signal appearing across secondary winding 109 of output transformer 108 will approach zero. However, in the presence of a flame source, sensor 18 will conduct thereby reducing the reflected impedance at primary winding 17 of excitation transformer 16. This reduction in impedance establishes a current flow in the primary windings of transformers 16 and 108 thereby establishing a signal output voltage across secondary winding 109. The alternating output signal appearing across winding 109 is subsequently converted to a proportional direct voltage signal by demodulator 110 and applied to an output indicating circuit represented by relay 112.

The energization of relay 112 is dependent on the conducting level of sensor 18 which in turn is related to the ultraviolet radiation intensity level. Therefore, relay 112 may be used to transmit a signal as an indication of the presence or absence of gas flame which has been found to generate appreciable ultraviolet radiation in the primary combustion zone. Further, a sensor sensitive to radiation in the visible range is not satisfactory for monitoring a gas flame due to the low luminosity thereof. Sensitivity adjustment 111 is connected in series with relay 112 to establish the voltage level at which relay 112 will be energized and, therefore, determines the ultraviolet radiation level required for an ON indication of gas flame.

Two independent outputs are derived from the signal developed by photovoltaic cell 22. Photovoltaic cell 22 may be described, when viewing the primary ignition zone of a solid or liquid fossil fuel, as producing a direct voltage signal with a superimposed fluctuating component having a frequency between 200–1500 Hz. Because of the logarithmic characteristic of the cell, as taught in United States application Ser. No. 590,295, filed Oct. 28, 1966, the magnitude of the fluctuating component is proportional to the ratio of flame flicker to average flame radiation. This ratio has been found to be a direct measure of the flame characteristics and is self-compensating for changes in radiation transmission such as might be caused by furnace haze, dust on the sighting lens and the like. This, then, is the primary signal used in determining flame condition. Normally, it is only when the average flame radiation falls below a predetermined value that the direct voltage signal corresponding thereto is of significance and used to sound an alarm and/or to cancel the primary signal.

The fluctuating and direct voltage signal components of the cell 22 output signal are separated and applied to independent channels or measuring circuits. The output signal from cell 22 is first attenuated by sensitivity switch 122 which permits the selection of discrete voltage level for a given fluctuating amplitude to steady state radiation ratio. The attenuated signal is passed through A.C. coupling capacitor 130 and applied to the input of an A.C. amplifier 132. The output signal of amplifier 132 is increased to a practical control voltage level by power amplifier 134 and subsequently converted to a direct voltage signal by demodulator circuit 140. The direct voltage output signal of demodulator 140 is applied to output relay 142 which functions as on ON-OFF indication of flame characteristics. By suitable choice of the circuit components and sighting of the detector, the fluctuating voltage component consists wholly or mainly of the higher frequencies in the range of 100 Hz. to 1,000 Hz. found only in the primary combustion zone thus giving a reliable indication of the presence or absence of flame unaffected by radiation from furnace walls and the like.

The direct voltage signal component is applied to a circuit consisting of a low pass filter 146, and a D.C. amplifier 154. The low pass filter 146 serves to remove the A.C. component from the signal transmitted to amplifier 154. The output signal from amplifier 154 is made available at a terminal 156 for indicating, recording, controlling and alarming purposes.

While, as previously discussed, because of the logarithmic relationship between signal output and cell illumination, the fluctauting signal derived from photovoltaic cell 22 normally provides a reliable guide of flame condition, we have found it desirable, nevertheless, when the average flame radiation reaches a predetermined value to inhibit operation of amplifier 132 thus placing relay 142 in "flame failure" position. This we do, as shown in FIG. 3, by providing a feedback circuit 138 for amplifier 132 which is normally open circuited by virtue of being shorted to ground through a transistor 143. When the average flame illumination falls to a predetermined value, however, the base drive of transistor 143 is changed by operation of a detector 144, responsive to the output signal from amplifier 154, thus feeding back the output signal of amplifier 132 to the input thereof and reducing the gain sufficiently to cause operation of device 142 to exhibit a "flame off" or "flame failure" condition.

What we claim as new and desire to secure by Letters Patent of the United States is:

1. A flame responsive device for generating signals representing the presence or absence of flame in a multiple fuel-fired furnace wherein said device comprises:
a tubular housing;
a lens mounted within said tubular housing;
a mounting plate positioned within said housing and fixedly secured to a flange at one end of said tubular housing;
a sighting plate having a central aperture mounted on said mounting plate at a position adjacent to said lens; said aperture transmitting the radiant energy focused by the lens;
an ultraviolet radiation detector mounted on said mounting plate aligned with the aperture of said sighting plate responsive to ultraviolet radiation transmitted through said aperture; and
a silicon photovoltaic detector mounted on said mounting plate also aligned with the aperture of said sighting plate responsive to the high frequency flicker and illumination level of radiation transmitted through said aperture.

2. A flame responsive device as claimed in claim 1 further including:
a rotary solenoid having a rotatable shaft mounted on said mounting plate; and
a shutter arm connected to the rotatable shaft normally in a position adjacent to, but not aligned with, the aperture of said sighting plate whereby energization of said solenoid will cause said shutter to be rotated to a position between the sighting plate aperture and said detectors so as to prevent radiant energy from being transmitted to said detectors thereby permitting an on-line check for deterioration of said detectors.

3. A flame responsive device as claimed in claim 1 further comprising a rotatable iris plate mounted on said mounting plate having a plurality of apertures of varying diameter equally spaced and circumferentially located near the periphery of said plate; said iris plate located so as to permit axial alignment of a desired iris aperture between the sighting plate aperture and said silicon photovoltaic detector thereby limiting the radiation viewed by said detector to prevent saturation of the detector as well as providing a means whereby a common output signal range of the detector can be established for various levels of radiation.

4. A flame responsive device as claimed in claim 1 wherein said ultraviolet detector is enclosed in a transparent envelope and the radiation transmitted through said aperture to said silicon photovoltaic detector passes through said envelope.

5. A flame responsive device as claimed in claim 1 further including a step-up transformer mounted on said mounting plate having a primary and a secondary winding, said ultraviolet detector including a pair of electrodes connected across said secondary winding and a source of relatively low voltage A.C. for energizing said primary winding.

6. A flame responsive device as claimed in claim 5 further including a second transformer located remotely from said device having a primary and a secondary winding, said primary winding connected in series circuit with the primary winding of said step-up transformer and said source of A.C. voltage, and means responsive to the voltage generated in the secondary winding of said second transformer when said ultraviolet detector is in a conducting state thereby reducing the impedance of said series circuit to permit an appreciable current flow through the primary winding of said second transformer.

7. A flame responsive device as claimed in claim 6 further including a first electric circuit connected to said silicon photoelectric detector, and means included in said circuit producing a first control signal proportional to the amplitude of the fluctuations in voltage produced by said detector in the range of 200–1,500 Hz.

8. A flame responsive device as claimed in claim 7 further including a second electric circuit connected to said silicon photoelectric detector and means included in said second circuit producing a second control signal corresponding to the magnitude of the EMF generated by said silicon photoelectric detector.

9. A flame responsive device as claimed in claim 8 further including means responsive to said second control signal inhibiting said first control signal when said second signal is at or below a preset value.

10. A flame responsive device as claimed in claim 9 further including a quartz window mounted in the end of said tubular housing remote from said first named end through which radiation passes on to said lens and thence to said detectors, an isolation tube surrounding said housing providing an annular air flow passageway with said housing, a seal between said housing and tube adjacent to said quartz window, a plurality of ports in said housing between said window and said seal, means for introducing low-pressure purge air into the annular space at the end of said housing remote from said window whereby said purge air passes through said annular space and is discharged through said ports against said window, and means for introducing high-pressure air radially into said isolation tube for providing a curtain of high-pressure air across said isolating tube when said tubular housing is withdrawn therefrom.

References Cited

UNITED STATES PATENTS

| | | | |
|---|---|---|---|
| 2,763,853 | 9/1956 | Grant | 250—218 X |
| 2,912,593 | 11/1959 | Deuth | 250—216 X |
| 3,185,846 | 5/1965 | Gilbert et al. | 250—83.3 X |
| 3,321,634 | 5/1967 | Innes | 250—83.3 X |
| 3,330,960 | 7/1967 | Rich | 250—217 X |

WALTER STOLWEIN, Primary Examiner

U.S. Cl. X.R.

250—83.3, 239; 340—228